United States Patent
Attar

(10) Patent No.: US 9,691,113 B2
(45) Date of Patent: Jun. 27, 2017

(54) SOFTWARE METHOD OF ORGANIZING AND DISTRIBUTING AIR-TRAVEL RELATED INFORMATION AMONGST A PLURALITY OF SUBSCRIBERS

(71) Applicant: Michael Joseph Attar, Westhampton, NY (US)

(72) Inventor: Michael Joseph Attar, Westhampton, NY (US)

( * ) Notice: Subject to any disclaimer, the term of this patent is extended or adjusted under 35 U.S.C. 154(b) by 371 days.

(21) Appl. No.: 14/092,615

(22) Filed: Nov. 27, 2013

(65) Prior Publication Data

US 2014/0344374 A1     Nov. 20, 2014

Related U.S. Application Data

(60) Provisional application No. 61/825,301, filed on May 20, 2013.

(51) Int. Cl.
  *G06F 15/16*     (2006.01)
  *G06Q 50/14*     (2012.01)
  *H04L 12/18*     (2006.01)

(52) U.S. Cl.
  CPC .......... *G06Q 50/14* (2013.01); *H04L 12/1859* (2013.01)

(58) Field of Classification Search
  USPC ....... 709/203, 206, 217, 219, 223, 224, 226, 709/228, 231, 232, 238; 705/5
  See application file for complete search history.

(56) References Cited

U.S. PATENT DOCUMENTS

| 2003/0055689 A1* | 3/2003 | Block | G06Q 10/02 705/5 |
| 2005/0216281 A1* | 9/2005 | Prior | G06Q 10/02 705/5 |
| 2009/0210262 A1* | 8/2009 | Rines | G06Q 10/06 705/5 |
| 2010/0017314 A1* | 1/2010 | Johnson | G06Q 10/025 705/30 |
| 2011/0213787 A1* | 9/2011 | Cerny | G06Q 10/02 707/749 |

* cited by examiner

*Primary Examiner* — Quang N Nguyen

(57) ABSTRACT

A travel information system is a software method of organizing and distributing air-travel related information amongst a plurality of subscribers. The software will begin by receiving updated air-travel information from an airline or an airport. The software will then format this information into a textual message that can comprehended by a user. Next, the software will tag the textual message with a unique designator for the specific airline or airport. Once the textual messages is formatted and tagged, the software will publish the textual message on a middleware broker, which allows a plurality of subscribers to access the textual message. The software will also send the textual message to a specific subscriber if that subscriber inputted a request that matches the unique designator of the airline or airport.

6 Claims, 5 Drawing Sheets

SOFTWARE METHOD OF ORGANIZING AND DISTRIBUTING AIR-TRAVEL RELATED INFORMATION AMONGST A PLURALITY OF SUBSCRIBERS

The current application claims a priority to the U.S. Provisional Patent application Ser. No. 61/825,305 filed on May 20, 2013.

FIELD OF THE INVENTION

The present invention relates generally to method to dynamically subscribe to an airline and or airports published events based on an easy, intuitive naming system

BACKGROUND OF THE INVENTION

Currently, individuals who travel on lots of different airlines throughout the world would like to get automated information on travel from said airlines and airports. This automated information would need to be efficiently organized and properly distributed amongst a plurality of subscribers. These subscribers would need to be able to receive information, events, and updates from any number of airlines and airports. It is therefore an object of the present invention to introduce a new method for a service that publishes airport and airline information, such as flight and baggage status utilizing Twitter feeds or similar publish and subscribe based approach using to an easily identifiable services interface based on a standardized naming methodology/handle.

DETAILED DESCRIPTIONS OF THE INVENTION

All illustrations of the drawings are for the purpose of describing selected versions of the present invention and are not intended to limit the scope of the present invention.

Figure 1:
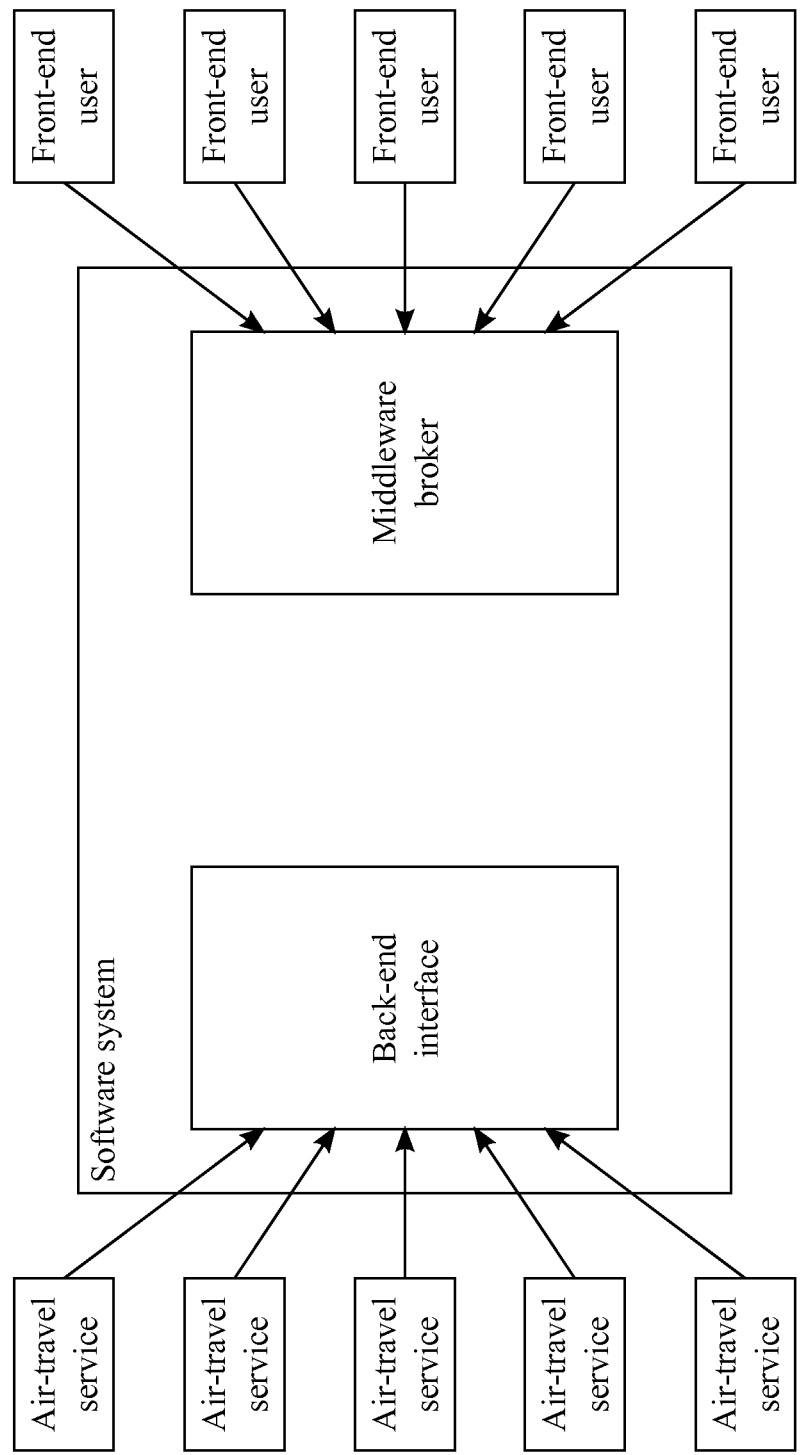
FIG. 1 is a block diagram of the system components for the present invention.

The present invention is a software method of organizing and distributing air-travel related information amongst a plurality of subscribers. The present invention is designed for users that travel through many different airlines and through many different airports. In general, the present invention allows different air-travel services, such airports and airlines, to publish air-travel related information and updates to a common hub, which can be accessed by different users. The present invention also allows users to dynamically identify and subscribe to those different air-travel services with an intuitive designation system. In reference to FIG. 1, the present invention implements its software method with some system components, which includes a back-end interface and a middleware broker. The back-end interface allows air-travel services to access and input data, such as the air-travel related information and updates, into the software. The middleware broker is the common hub between the air-travel services and the users to share information. In the preferred embodiment of the present invention, the middleware broker is a kind of micro-blogging service such as Twitter. In addition, the present invention is provided and manages a plurality of air-travel service profiles, each of which acts a virtual avatar for a specific airline or airport. For example, Baltimore Washington International Airport and Southwest Airlines would each have their own air-travel service profile on the software so that they can be uniquely identified by the software.

Figure 2:
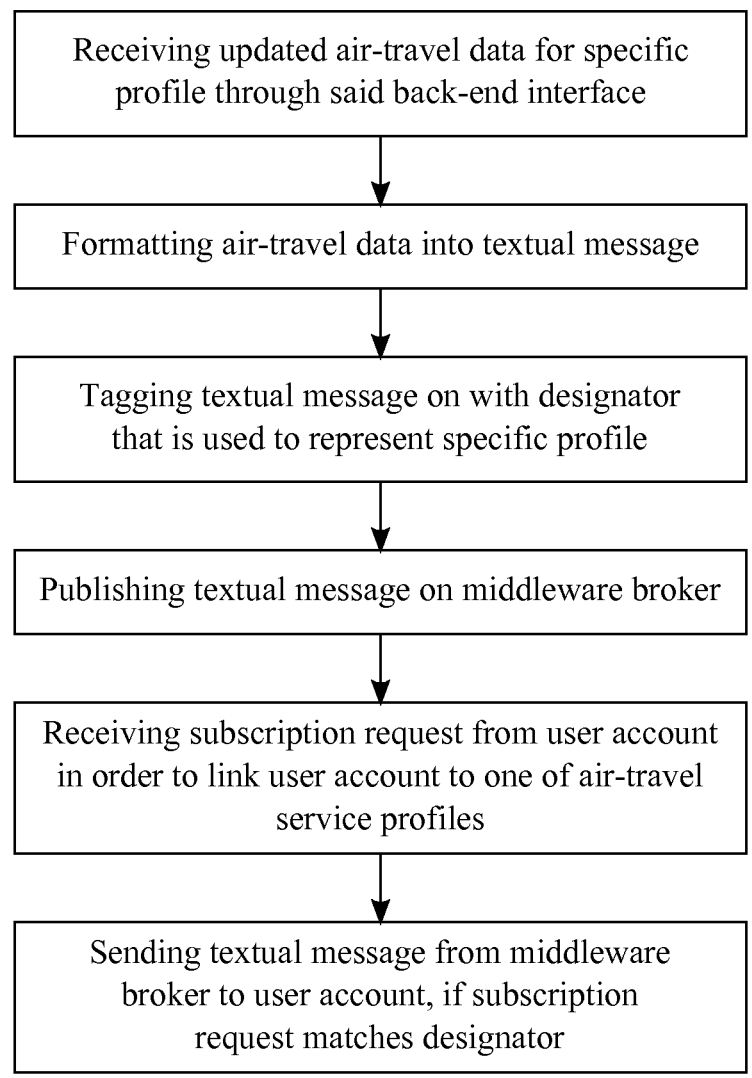
FIG. 2 is a flow chart of the overall process for the present invention.

As can be seen in FIG. 2, the present invention follows a primary process in order to organize and distribute air-travel related information amongst its plurality of subscribers. The primary process begins by receiving updated air-travel data for a specific profile through the back-end interface. The specific profile refers to any air-travel service profile that is managed by the present invention. The air-travel data can be any information, event, or update that is relevant to the specific profile. For example, the updated air-travel data could be facilities information of either the airport or airline. The air-travel data can also be retrieved through computerized or human means. The primary process continues by formatting the updated air-travel data into a textual message, which is coherent and understandable translation of the updated air-travel data. For example, the numeric time schedule for a specific flight could be changed to "The boarding time for [specific flight] is 04:00, and the departure time for [specific flight] is 04:25". The primary process carries on by tagging the textual message with a designator, which is used to uniquely represent the specific profile amongst all of the other air-travel service profiles. The primary process proceeds by publishing the textual message onto the middleware broker so that any user can view the textual message on the specific profile. The primary process continues by receiving a subscription request from a user account in order to link the user account to one of the plurality of air-travel service profiles. The user account is the means by which a user can access and output data from the software. The subscription request allows a user to select which of the plurality of air-travel service profiles that the user wants to receive air-travel related information from. The primary process concludes by sending the textual message from the middleware broker to the user account, if the subscription request matches the designator. This allows a user to be directly notified of information, events, or updates that are published by their favorite air-travel services.

In the preferred embodiment of the present invention, the specific profile is either for an airport or an airline. If the specific profile is for an airport, then the updated air-travel data would be related to that airport and the designator would be used to distinguish that airport from other air-travel services. For example, if the specific profile is for John F. Kennedy Airport, then the updated air-travel data would be relevant to John F. Kennedy Airport. The designator would be "#JFK", which allows a user to know that the textual message is in reference to John F. Kennedy Airport. The subscription request would be "@JFK", which allows the software to direct textual messages regarding John. F Kennedy Airport towards its specified users. Similarly, if the specific profile is for an airline, then the updated air-travel data would be related to that airline and the designator would be used to distinguish that airline from other air-travel services. For example, if the specific profile is for American Airlines, then the updated air-travel data would be relevant to American Airlines and the designator would be "#AA", which allows a user to know that the textual message is in reference to American Airlines. The subscription request would be "@AA", which allows the software to direct textual messages regarding American Airlines towards its specified users.

Figure 3:
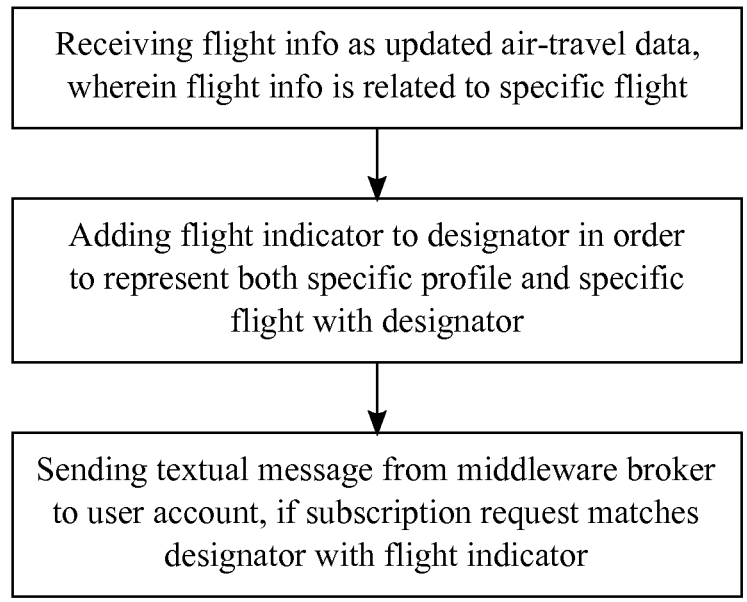
FIG. 3 is a flow chart depicting the modifications to the overall process if the present invention is used for a specific flight.

A secondary process implemented by the present invention is publishing information about a specific flight for either an airport or an airline, which is shown in FIG. 3. This secondary process begins by receiving flight information as the updated air-travel data. The flight information is related to the specific flight. For example, the flight information can be, but is not limited to, the arrival/departure status, gate changes, and baggage claim locations for the specific flight. This secondary process continues by adding a flight indicator to the designator, which allows the designator to represent both the specific profile and the specific flight. For example, if the specific profile is American Airlines and the specific flight is 404, then the designator with the flight indicator would read "#AA404". This secondary process concludes by sending the textual message from the middleware broker to the user account, if the subscription request matches the designator with the flight indicator. For example, if the specific profile is American Airlines and the specific flight is 404, the subscription request would need to read "@AA404" in order to match the subscription request to the designator.

Figure 4:
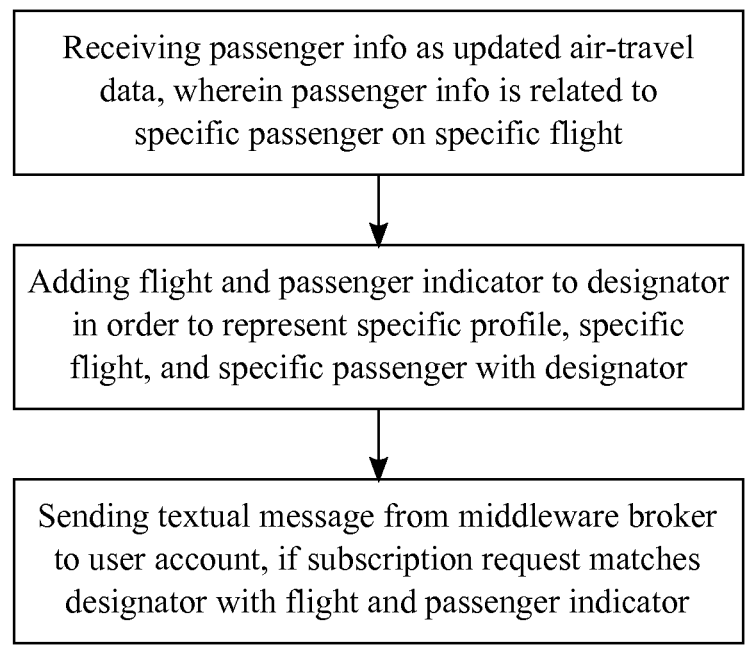
FIG. 4 is a flow chart depicting the modifications to the overall process if the present invention is used for a specific passenger on a specific flight.

As can be seen in FIG. 4, another secondary process implemented by the present invention is publishing information about a specific passenger on a specific flight for either an airport or an airline. This secondary process begins by receiving passenger information as the updated air-travel data. The passenger information is related to the specific passenger on the specific flight. For example, the passenger information can be, but is not limited to, menu selections based on seating class, boarding times based on seating class, and instructions to the nearest exit. This secondary process continues by adding a flight indicator and a passenger indicator to the designator, which allows the designator to represent the specific profile, the specific flight, and the specific passenger. For example, if the specific profile is American Airlines, the specific flight is 404, and the specific passenger's ticket number is 88888, then the designator with the flight indicator and the passenger indicator would read "#AA40488888". This secondary process concludes by sending the textual message from the middleware broker to the user account, if the subscription request matches the designator with the flight indicator and the passenger indicator. For example, if the specific profile is American Airlines, the specific flight is 404, and the specific passenger's ticket number is 88888, the subscription request would need to read "@AA40488888" in order to match the subscription request to the designator.

Figure 5:
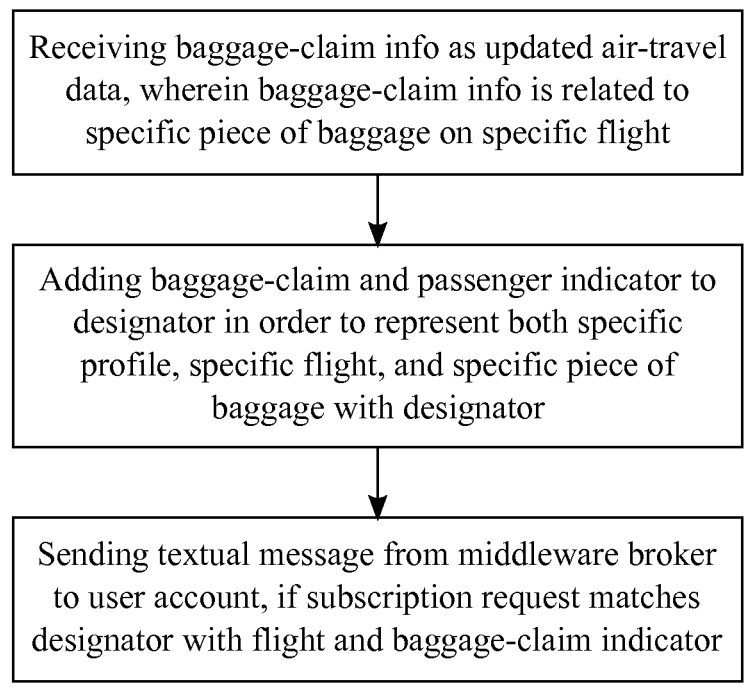
FIG. 5 is a flow chart depicting the modifications to the overall process if the present invention is used for a specific piece of baggage on a specific flight.

In reference to FIG. 5, another secondary process implemented by the present invention is publishing information about a specific piece of baggage on a specific flight for either an airport or an airline. This secondary process begins by receiving baggage-claim information as the updated air-travel data. The baggage-claim information is related to the specific piece of baggage on the specific flight. For example, the baggage-claim information can be, but is not limited to, the current location of the specific piece of baggage and the time and the location when the specific piece of baggage can be claimed at the airport. This secondary process continues by adding a flight indicator and a baggage-claim indicator to the designator, which allows the designator to represent the specific profile, the specific flight, and the specific piece of baggage. For example, if the specific profile is American Airlines, the specific flight is 404, and the specific piece of baggage's claim number is 999999, then the designator with the flight indicator would read "#AA404999999". This secondary process concludes by sending the textual message from the middleware broker to the user account, if the subscription request matches the designator with the flight indicator and the baggage-claim indicator. For example, if the specific profile is American Airlines, the specific flight is 404, and the specific piece of baggage's claim number is 999999, the subscription request would need to read "@AA404999999" in order to match the subscription request to the designator.

Although the invention has been explained in relation to its preferred embodiment, it is to be understood that many other possible modifications and variations can be made without departing from the spirit and scope of the invention as hereinafter claimed.

What is claimed is:

1. A method of organizing and distributing air-travel related information amongst a plurality of subscribers by executing computer-executable instructions stored on a non-transitory computer-readable medium, the method comprises the steps of:
    providing and managing a plurality of air-travel service profiles;
    providing a back-end interface and a middleware broker;
    receiving updated air-travel data for a specific air-travel service profile through said back-end interface, wherein said specific air-travel service profile is from said plurality of air-travel service profiles;
    formatting said updated air-travel data into a textual message; wherein the formatting comprises translating a numeric data comprised in the updated air-travel data into the textual message comprising words;
    tagging said textual message with a designator, wherein said designator represents said specific air-travel service profile;
    publishing said textual message on said middleware broker;
    receiving a subscription request from a user account in order to link said user account to one of said plurality of air-travel service profiles;
    receiving flight information as said updated air-travel data, wherein said flight information is related to a specific flight;
    adding a flight indicator to said designator in order to represent both said specific air-travel service profile and said specific flight with said designator; and
    if said subscription request matches said designator with said flight indicator, sending said textual message from said middleware broker to said user account.

2. The method of organizing and distributing air-travel related information amongst a plurality of subscribers by executing computer-executable instructions stored on a non-transitory computer-readable medium, the method as claimed in claim 1, wherein:
    said specific air-travel service profile being for an airport;
    said updated air-travel data being related to said airport;
    said designator being used to distinguish said airport; and
    said subscription request being used to distinguish said airport.

3. The method of organizing and distributing air-travel related information amongst a plurality of subscribers by executing computer-executable instructions stored on a non-transitory computer-readable medium, the method as claimed in claim 1, wherein:
    said specific air-travel service profile being for an airline;
    said updated air-travel data being related to said airline;
    said designator being used to distinguish said airport; and
    said subscription request being used to distinguish said airport.

4. The method of organizing and distributing air-travel related information amongst a plurality of subscribers by executing computer-executable instructions stored on a non-transitory computer-readable medium, the method as claimed in claim 1, wherein facilities information is received as said updated air-travel information.

5. The method of organizing and distributing air-travel related information amongst a plurality of subscribers by executing computer-executable instructions stored on a non-transitory computer-readable medium, the method as claimed in claim 1 comprises the steps of:
    receiving passenger information as said updated air-travel data, wherein said passenger information is related to a specific passenger on a specific flight;
    adding a flight indicator and a passenger indicator to said designator in order to represent said specific air-travel service profile, said specific flight, and said specific passenger with said designator; and
    if said subscription request matches said designator with said flight indicator and said passenger indicator, sending said textual message from said middleware broker to said user account.

6. The method of organizing and distributing air-travel related information amongst a plurality of subscribers by executing computer-executable instructions stored on a non-transitory computer-readable medium, the method as claimed in claim 1 comprises the steps of:
    receiving baggage-claim information as said updated air-travel data, wherein said baggage-claim information is related to a specific piece of baggage on a specific flight;
    adding a flight indicator and a baggage-claim indicator to said designator in order to represent said specific air-travel service profile, said specific flight, and said specific piece of baggage with said designator; and
    if said subscription request matches said designator with said flight indicator and said baggage-claim indicator, sending said textual message from said middleware broker to said user account.

\* \* \* \* \*